US007769500B2

(12) United States Patent
Kuentzle

(10) Patent No.: US 7,769,500 B2
(45) Date of Patent: Aug. 3, 2010

(54) METHOD AND DEVICE FOR OPERATING A DRIVE UNIT, AND TEST DEVICE FOR TESTING A DRIVE UNIT

(75) Inventor: Matthias Kuentzle, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 11/728,695

(22) Filed: Mar. 26, 2007

(65) Prior Publication Data

US 2007/0239323 A1 Oct. 11, 2007

(30) Foreign Application Priority Data

Apr. 11, 2006 (DE) ...................... 10 2006 016 894

(51) Int. Cl.
*G06F 17/00* (2006.01)

(52) U.S. Cl. .......................... 701/1; 701/108; 701/115; 701/300; 307/10.1; 318/400.15

(58) Field of Classification Search .................... 701/1, 701/29, 108, 115, 300; 318/400.15
See application file for complete search history.

(56) References Cited

U.S. PATENT DOCUMENTS

2003/0200022 A1* 10/2003 Streichsbier et al. ........ 701/108
2004/0260470 A1* 12/2004 Rast .......................... 701/300
2005/0253455 A1* 11/2005 Haas ......................... 307/10.1

FOREIGN PATENT DOCUMENTS

DE 102 61 382 7/2004

* cited by examiner

*Primary Examiner*—Khoi Tran
*Assistant Examiner*—Rodney King
(74) *Attorney, Agent, or Firm*—Kenyon & Kenyon LLP

(57) ABSTRACT

In a method for operating a drive unit, for at least one operating quantity of the drive unit, a deviation from an initial value is represented by an adaptation value, which adaptation value is determined at various times. In an extreme value storage unit, a first adaptation value, determined at a first point in time, is stored. A second adaptation value, determined at a second point in time after the first point in time, is compared with the first adaptation value stored in the extreme value storage unit to determine whether the second adaptation value exceeds the first adaptation value in a prespecified direction. In this case, the extreme value storage unit is overwritten by the second adaptation value.

10 Claims, 2 Drawing Sheets

METHOD AND DEVICE FOR OPERATING A DRIVE UNIT, AND TEST DEVICE FOR TESTING A DRIVE UNIT

BACKGROUND OF THE INVENTION

1. Field of the Invention

The present invention relates to a method and a device for operating a drive unit, and to a test device for testing a drive unit.

2. Description of Related Art

Methods and devices are known for operating a drive unit of a vehicle in which for at least one operating quantity of the drive unit a deviation from an initial value is represented by an adaptation value, and in which the adaptation value is determined at various times.

For example, published German patent document DE 102 61 382 describes a method for adapting the characteristic curve of an intake-manifold pressure sensor of an internal combustion engine, the characteristic curve being adapted, in particular repeatedly, for at least two different pressures in an intake manifold of the internal combustion engine.

In addition, test devices are known for testing a drive unit of a vehicle, for example in the form of an official tester or a workshop tester that reads out at least one adaptation value from an engine control unit of the vehicle, the at least one adaptation value being used as described to represent a deviation of at least one operating quantity of the drive unit from an initial value.

At the present time, only current adaptation values are determined by the engine control unit and read out from the engine control unit by the test device. Thus, it can occur that an adaptation value is determined by the engine control unit and outputted to the test device that does not correspond to the maximum or minimum adaptation value occurring in the drive unit of the vehicle. Depending on the operating quantity, for example in the summer high adaptation values may result due to the high external temperature, and in the winter correspondingly low adaptation values may result due to the cold. If only the current adaptation values are read out by the test device, the workshop evaluating the adaptation value may be misled.

In a long-term test of the vehicle manufacturer as well, it is not the maximum occurrent adaptation value or minimum occurrent adaptation value, which is an indication of quality, that is determined and read out by a corresponding test device, but rather only that adaptation value that was momentarily determined and stored by the engine control unit of the vehicle during the reading out by the test device.

BRIEF SUMMARY OF THE INVENTION

The method and the device according to the present invention for operating a drive unit provide the advantage that, in an extreme value storage unit, a first adaptation value determined at a first point in time is stored, and that a second adaptation value, determined at a second point in time after the first point in time, is compared with the first adaptation value stored in the extreme value storage unit, and that it is checked whether the second adaptation value exceeds the first adaptation value in a prespecified direction, and that in this case the extreme value storage unit is overwritten with the second adaptation value. In this way, not only can the current adaptation value be determined and evaluated, but also the extreme occurring adaptation value, e.g., the minimum occurring adaptation value or the maximum occurring adaptation value, can be made available. This value can then be read out from the extreme value storage unit by the vehicle manufacturer or in the workshop and evaluated. The evaluation on the basis of the extreme occurring adaptation value enables a more reliable quality control or error diagnosis.

It is particularly advantageous if the adaptation value determined immediately after the first adaptation value is selected as the second adaptation value. In this case, no additional adaptation value is determined between the determination of the first adaptation value and the determination of the second adaptation value. In this way, it is ensured that the extreme adaptation value determined after the first point in time in the prespecified direction is stored immediately after the second point in time in the extreme value storage unit.

Another advantage results from the fact that each currently determined adaptation value is compared with the adaptation value just stored in the extreme value storage unit, and that the extreme value storage unit is overwritten with the currently determined adaptation value whenever the currently determined adaptation value exceeds, in the prespecified direction, the adaptation value just stored in the extreme value storage unit. In this way, it is ensured that the adaptation value just stored in the extreme value storage unit is the extreme adaptation value, in the prespecified direction, of all adaptation values determined up to that time. The extreme adaptation value stored in the extreme value storage unit is thus particularly effective for quality control or error monitoring.

In order to determine the minimum adaptation value, it is advantageous if the extreme value storage unit is chosen to be a minimum value storage unit, and the prespecified direction points towards smaller adaptation values. In order to determine the maximum adaptation value, it is advantageous if the extreme value storage unit is chosen to be a maximum value storage unit and the prespecified direction points towards larger adaptation values.

Arbitrary operating quantities of the drive unit can be adapted, such as for example an oxygen concentration in the exhaust gas, a temperature, a degree of opening of a valve or of a throttle valve, a torque, in particular a torque loss, a mass flow, in particular an air mass flow, a pressure, a controller portion, an ignition point, an injection time, a rotational speed, or the like.

In addition, it is advantageous if the extreme value storage unit is initialized by the first-determined adaptation value after an initial starting of the drive unit. In this way, the precondition is created that for the determination of the extreme adaptation value all the adaptation values determined since the initial starting of the drive unit can be taken into account, so that the correspondingly determined extreme adaptation value achieves maximum effectiveness for quality control or error monitoring.

The test device according to the present invention has the advantage that the means for reading out at least one adaptation value in a device for operating the drive unit read out an extreme adaptation value from an extreme value storage unit of the device. In this way, the test device can also be used to evaluate the extreme adaptation value for the purpose of quality control or error monitoring, so that the quality control or error monitoring achieves greater reliability and is no longer dependent only on the currently determined adaptation value.

It is advantageous that means are provided that detect an error of the drive unit dependent on the extreme adaptation value read out from the extreme value storage unit. In this way, the reliability of the error detection by the test device can be increased.

In addition, it is advantageous if means are provided that display the extreme adaptation value read out from the extreme value storage unit. In this way, the test device can also make known the extreme adaptation value as additional information.

DETAILED DESCRIPTION OF THE INVENTION

Figure 1:
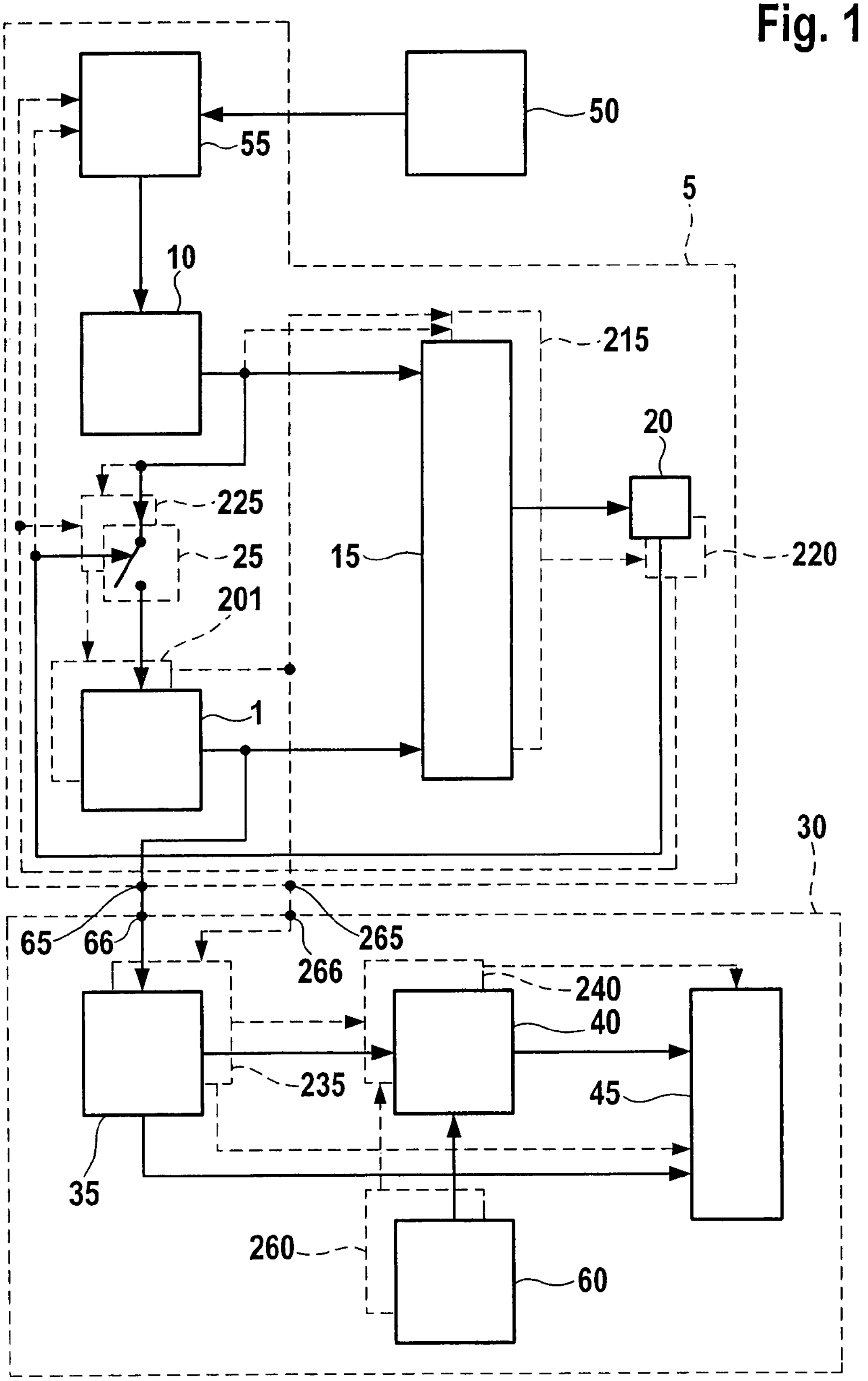
FIG. 1 shows a functional block diagram illustrating an example method according to the present invention and the device according to the present invention.

In FIG. 1, reference number 5 designates a device for operating a drive unit, for example a vehicle; device 5 can be implemented in terms of software and/or in terms of hardware in an engine control unit of the vehicle, or device 5 can represent the engine control unit itself, of which, however, only the parts relevant to the present invention are shown in FIG. 1. For example, the drive unit can include an internal combustion engine. However, alternatively, other drive designs, such as for example an electric motor or a hybrid drive made up of an electric motor and an internal combustion engine, can also be used in connection with the present invention. In the case of an internal combustion engine, these can for example be fashioned as a spark-ignition engine or as a diesel engine.

Device 5 includes an adaptation unit 10 that adapts at least one operating quantity of the drive unit. This means that for at least one operating quantity of the drive unit the adaptation unit uses an adaptation value to represent a deviation from an initial value, and determines this adaptation value at various times. Such an adaptation is for example used in the engine control unit to learn systematic errors of engine components, such as for example lambda probes, temperature sensors, pressure sensors, mass flow sensors, rotational speed sensors, positional sensors of valves or throttle valves, etc. Such errors result, for example, from manufacturing tolerances, i.e., deviations from what are known as golden sensors, or from aging or contamination of the sensors. Using the adaptation values determined by the adaptation unit, for example such a systematic error of an engine component can be compensated by a pre-controlling, so that a controller that may be present then has to compensate only a dynamic control deviation that is independent of the error.

The adaptation values determined by adaptation unit 10 are, in addition, an indication of the state of the drive unit. Adaptation values having a high magnitude indicate large component tolerances, or even an error in the drive unit or in the corresponding sensor.

In order to assess the quality of long-term operation of the drive unit, for example, at the end of the assembly line at the vehicle manufacturer, and as an aid for finding errors in the workshop, the adaptation values are outputted from the engine control unit, for example from adaptation unit 10, to a corresponding test device, for example, to an official tester or a workshop tester. These adaptation values reflect the state of the corresponding sensors, or in general the state of the drive unit, and allow a particular error to be inferred, or provide additional information concerning an error that has already been entered into an error storage unit of the engine control unit.

Some examples of adaptable operating quantities of the drive unit include the following (without being exhaustive):

Oxygen concentration in the exhaust gas; temperature; degree of opening of a valve or of a throttle valve; torque, in particular a torque loss or an output torque; mass flow, in particular an air mass flow or a fuel mass flow; pressure; controller portion, in particular an integral portion, a proportional portion, or a differential portion; ignition point; injection time; rotational speed; etc.

In addition, device 5 has a control unit 55 that controls an adaptation unit 10 and to which the signal of a crank angle sensor 50 is supplied. Crank angle sensor 50 detects, in a manner known to those skilled in the art, the current crank angle of a crankshaft driven by the drive unit. Drive unit 55 then for example causes adaptation unit 10 to determine a new adaptation value for the operating quantity to be adapted at predetermined crank angles, for example at regular or irregular crank angle intervals.

The determination of the adaptation values by adaptation unit 10 takes place at a crank angle provided for this purpose, which in turn is correlated with a corresponding point in time via the engine rotational speed.

In addition, device 5 has an extreme value storage device 1 to which the adaptation value currently determined by adaptation unit 10 is able to be supplied via a controlled switch 25.

Extreme value storage unit 1 is for example initialized with a predetermined value, for example with the value zero, before the startup of device 5, and thus also of adaptation unit 10. In addition, or alternatively, it can be provided that extreme value storage unit 1 is initialized upon the first startup of device 5, and thus of adaptation unit 10, with the first adaptation value of adaptation unit 10 determined at that time. For this purpose, switch 25 can be controlled by control unit 55 in a manner not shown in such a way that switch 25 is closed upon the first startup of device 5, for example upon an initial starting of the drive unit, and is opened again after the controlling of adaptation unit 10 in order to determine the first adaptation value after the initial starting and before the controlling of adaptation unit 10 for the determination of the second adaptation value after the initial starting, so that the extreme value storage unit is initialized by the adaptation value that is first determined after the initial starting of the drive unit, or is overwritten if it was previously initialized with another value, for example 0.

Thus, quite generally, at the output of adaptation unit 10 there is the last adaptation value determined by adaptation unit 10. This value is not only capable of being supplied to extreme value storage unit 1 via switch 25, but is also supplied to a comparator unit 15. The extreme adaptation value currently stored in extreme value storage unit 1 is present at the output of extreme value storage unit 1. This value is also supplied to comparator unit 15. Comparator unit 15 compares the last-determined adaptation value with the currently present extreme adaptation value in a prespecified direction. If the last-determined adaptation value exceeds the current extreme adaptation value in the specified direction, comparator unit 15 produces a setting signal at its output; otherwise, the output signal of comparator unit 15 remains deferred. The output signal of comparator unit 15 is supplied to a test unit 20. If test unit 20 receives from comparator unit 15 a setting signal, it causes switch 25 to close, and thus causes the output of adaptation unit 10 to be connected to the input of extreme value storage device 1, so that extreme value storage device 1 is overwritten with the adaptation value last determined by adaptation unit 10. Here is important that the described comparison operation by comparator unit 15 and the described test operation by testing unit 20, and the possible closing of switch 25 for overwriting the extreme value storage unit 1 with the value at the output of adaptation unit 10, takes place before the determination of the next adaptation value by adaptation unit 10. For this purpose, it can for example be provided that control unit 55 causes the determination of the next adaptation value by adaptation unit 10 at the earliest after a predetermined waiting period, applied for example on a test bench in such a way that the described comparison and testing operation takes place within this predetermined waiting period until the closing of switch 25, so that extreme value storage unit 1 can be overwritten with the last-determined adaptation value at the output of adaptation unit 10. Here, testing unit 20 causes switch 25 to close only as long as is required for the overwriting of extreme value storage unit 1 by the output of adaptation unit 10, possibly taking into account a safety time interval in order to avoid termination of the overwrite process before the updating of extreme value storage unit 1. The predetermined waiting period to be observed by control unit 55 until the controlling for the determination of the next adaptation value must therefore also cover the time required for the closing of switch 25 until the reopening of switch 25. This prevents extreme value storage unit 1 from being overwritten immediately by the next-determined adaptation value before this overwriting can be enabled by testing unit 20 upon the presence of a setting signal at the output of comparator unit 15.

Alternatively, the controlling of adaptation unit 10 by control unit 55 in order to determine the subsequent adaptation value can also be realized by an enable signal, as is shown in broken lines in FIG. 1. For this purpose, the control signal of testing unit 20 for switch 25 can also be supplied (in the manner shown in broken lines) to control unit 55, such that a controlling of adaptation unit 10 by control unit 55 with the closing pulse for switch 25 is blocked and then enabled again upon the subsequent opening pulse for switch 25.

Device 5 thus ensures that the adaptation value determined subsequent to the last-determined adaptation value of adaptation unit 10 is compared with the current extreme adaptation value, possibly formed by the last-determined adaptation value, in comparator unit 15 in order to again overwrite extreme value storage unit 1 in the described manner, if warranted. In this way, each adaptation value currently determined by adaptation unit 10 can be compared with the adaptation value just stored in extreme value storage unit 1, extreme value storage unit 1 being overwritten by the adaptation value currently determined by adaptation unit 10 whenever this currently determined adaptation value exceeds the adaptation value just stored in extreme value storage unit 1 in the specified direction.

According to a first alternative example embodiment, extreme value storage unit 1 can be fashioned as a minimum value storage unit, and the direction specified for the comparison in comparator unit 15 can point towards smaller adaptation values. This means that extreme value storage unit 1 is overwritten by the adaptation value last determined by adaptation unit 10 only if this value is smaller than the current extreme adaptation value at the output of extreme value storage unit 1.

According to a second alternative example embodiment, extreme value storage unit 1 can be fashioned as a maximum value storage unit, and the direction specified for the comparison in comparator unit 15 can point towards larger adaptation values. In this case, extreme value storage unit 1 is overwritten by the adaptation value last determined by adaptation unit 10 only if this value exceeds the extreme adaptation value currently present at the output of extreme value storage unit 1.

Thus, in the first alternative example embodiment, the minimum determined adaptation value is stored in the minimum value storage unit. According to the second alternative example embodiment, the maximum determined adaptation value is stored in the maximum value storage unit.

The minimum value storage unit thus contains the absolute minimum of all adaptation values determined up to that time by adaptation unit 10. The maximum value storage unit thus contains the absolute maximum of all adaptation values determined up to that time by adaptation unit 10.

Device 5 can be realized in the described manner for an arbitrary operational quantity that is to be adapted of the drive unit. Thus, it is also possible to provide a plurality of devices 5, each of which is allocated to a different operational quantity that is to be adapted of the drive unit.

FIG. 1 shows a terminal 65 of device 5 that is connected to the output of extreme value storage device 1. Terminal 65 represents a first terminal. In addition, FIG. 1 shows a test device 30 that can for example be fashioned as an official tester or as a workshop tester and used to test the drive unit. Test device 30 has a terminal 66 that is designated below as the second terminal, and is provided according to FIG. 1 for connection to the first terminal 65. Test device 30 includes a readout unit 35. If test device 30 is connected via its terminal 66 to terminal 65 of device 5, as is shown in FIG. 1, readout unit 35 reads out the extreme adaptation value currently present at the output of extreme value storage device 1, and thus currently stored in extreme value storage unit 1. According to FIG. 1, test device 30 further includes an error detection unit to which the current extreme adaptation value read out by readout unit 35 is supplied. In addition, a suitably applied (for example on a test bench) threshold value is supplied to error detection unit 40 by a threshold value storage unit 60 of test device 30. Error detection unit 40 compares the read-out current extreme adaptation value with the threshold value and detects an error if the read-out current extreme adaptation value deviates in its magnitude from the threshold value by more than a prespecified tolerance value, for example also applied on a test bench. In this case, a corresponding error signal is transmitted to a display unit 45 of test device 30, and is optically and/or acoustically displayed there. Additionally, or alternatively, the read-out current extreme adaptation value can also be supplied directly to display unit 45 by readout unit 35, and can be optically and/or acoustically displayed by display unit 45.

The test device system 30 presented and described in FIG. 1 can also be provided for various operating quantities of the drive unit that are to be adapted, an interface to the engine control unit of the motor vehicle, analogous to first terminal 65 and to second terminal 66, being formed for each of these operating quantities in order to enable detection and possible displaying of an error state for each of the various operating quantities that are to be adapted.

In addition, it can be provided that, in addition to the current extreme adaptation value, the adaptation value last determined by adaptation unit 10 can also be transmitted to test device 30 via a corresponding interface, and used there for error evaluation, and possibly displayed.

In addition, it can optionally be provided that the time and/or environmental conditions, e.g., temperature, rotational speed, height, load, can be stored in device 5, whereupon extreme value storage unit 1 is initialized or overwritten. The named time and/or the named environmental conditions can likewise be read out from test device 30 in a manner not shown. Thus, during error detection in test device 30 it can be taken into account how long ago the determination of the read-out current extreme adaptation value was carried out, and in particular which travel route the vehicle driven by the drive unit has covered since then, and/or, in the case of a spark-ignited engine, how many ignitions have taken place since then and/or under which environmental conditions the value came about. The determination of the travel path or number of ignitions or named environmental conditions can be carried out in device 5 in a manner known to those skilled in the art, and can be transmitted to test device 30 via a suitable interface. Thus, dependent on the travel path traveled since the determination of the read-out current extreme adaptation value and/or the number of ignitions and/or the general time elapsed, and/or dependent on the named environmental conditions, the comparison result can be weighted in error detection unit 40, so that for example the deviation in terms of magnitude of the read-out current extreme adaptation value from the threshold value is weighted less strongly the longer the time, the greater the distance traveled, or the greater the number of ignitions since the determination of the current extreme adaptation value, or the closer to an extreme value one or more environmental conditions are when the current extreme adaptation value is determined. The less strongly this deviation is weighted, the smaller is the probability that its magnitude exceeds that of the prespecified tolerance value, and thus the probability is smaller that an error will be detected. This makes sense to the extent that the read-out current extreme adaptation value is obviously not determined permanently by adaptation unit 10.

Figure 2:
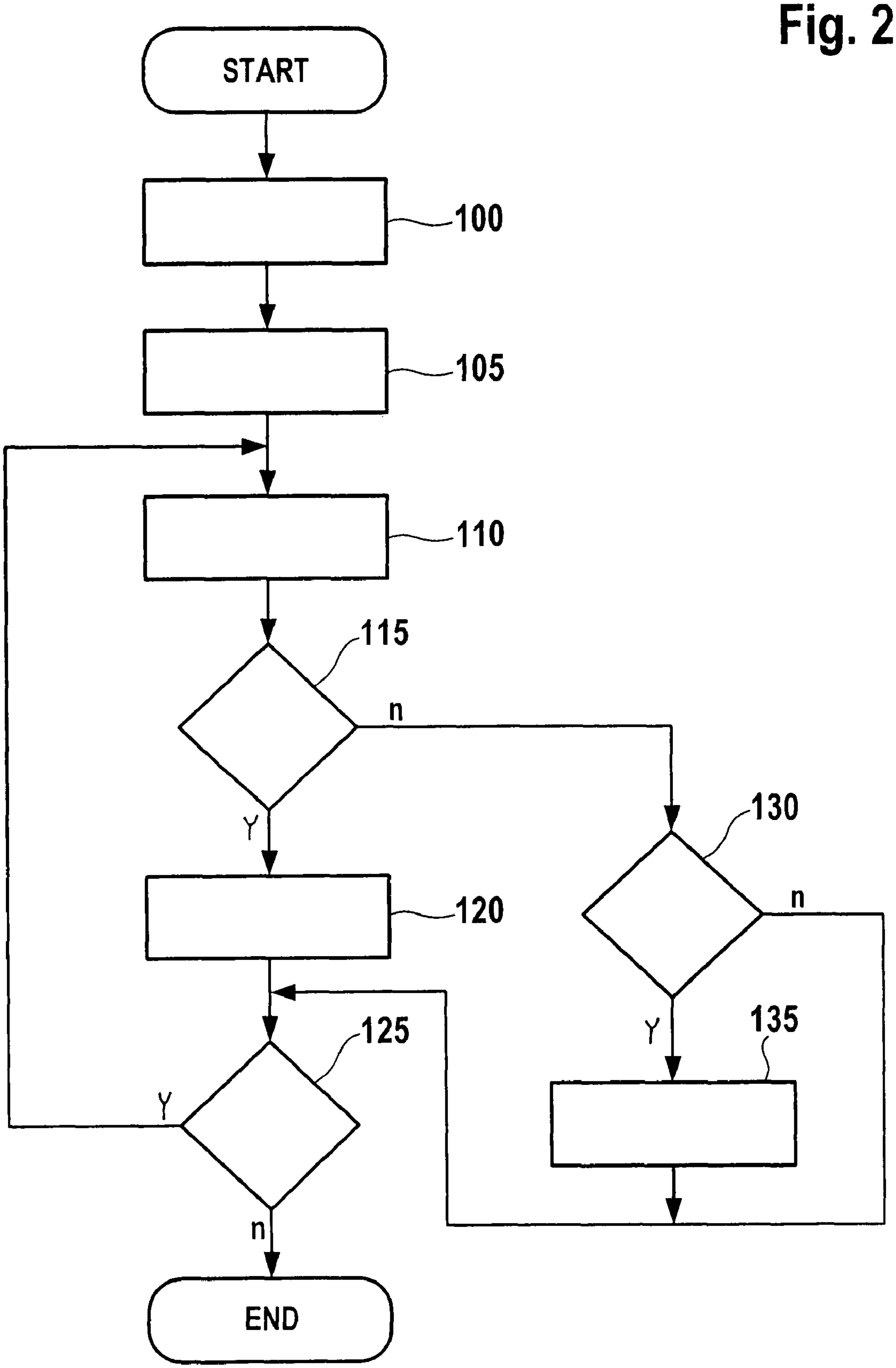
FIG. 2 shows a flowchart of an exemplary sequence of the method according to the present invention.

FIG. 2 shows a flowchart of an exemplary sequence of the method according to the present invention.

After the start of the program, which for example can coincide with the initial start of the drive unit, adaptation unit 10, controlled by control unit 55, determines a first adaptation value. Subsequently, branching takes place to a program point 105.

At program point 105, the minimum value storage unit and the maximum value storage unit are initialized in the described manner by the first adaptation value determined by adaptation unit 10. Subsequently, branching takes place to a program point 110.

At program point 110, control unit 55 causes adaptation unit 10 to determine the next adaptation value.

Subsequently, branching takes place to a program point 115.

At program point 115, for the maximum value comparison the comparator unit checks whether the adaptation value last determined by adaptation unit 10 is greater than the current maximum adaptation value present at the output of the maximum value storage unit. If this is the case, branching takes place to a program point 120; otherwise, branching takes place to a program point 130.

At program point 120, the maximum value storage unit is overwritten in the described manner by the adaptation value last determined by adaptation unit 10. Subsequently, branching takes place to a program point 125.

At program point 130, for the minimum value comparison the comparator unit checks whether the adaptation value last determined by adaptation unit 10 is smaller than the minimum adaptation value currently present at the output of the minimum value storage unit. If this is the case, branching takes place to a program point 135; otherwise, branching takes place to program point 125.

At program point 135, the minimum value storage unit is overwritten in the described manner by the adaptation value last determined by adaptation unit 10. Subsequently, branching takes place to program point 125.

At program point 125, control unit 55 checks whether a new adaptation value is to be determined by adaptation unit 10. If this is the case, branching takes place back to program point 110, and as soon as the enable signal for the adaptation is present, control unit 55 causes adaptation unit 10 to determine the next adaptation value. If, at program point 125, control unit 55 determines that no new adaptation value is to be determined by adaptation unit 10, the program is exited.

For the case in which both maximum value storage unit 201 and also minimum value storage unit 1 are provided for an operating quantity that is to be adapted, the structure of device 5 can be doubled except for control unit 55 and adaptation unit 10, i.e., the output of adaptation unit 10 is supplied both to a comparator unit 15 for the minimum value comparison and to a comparator unit 215 for the maximum value comparison. Here, the adaptation value last determined by adaptation unit 10 is supplied to minimum value storage unit 1 via a first controlled switch 25, and is supplied to maximum value storage unit 201 via a second controlled switch 225, first controlled switch 25 being controlled by a testing unit 20 at the output of comparator unit 15 for the minimum value comparison and second controlled switch 225 being controlled by a testing unit 220 at the output of comparator unit 215 for the maximum value comparison in the described manner, and the respective control signal for the allocated controlled switch 25, 225 is supplied to control unit 55 by both testing units 20, 220 in order to determine whether the determination of a new adaptation value can be enabled, and this control signal is evaluated in the described manner. The enabling of the determination of a new adaptation value is granted by control unit 55 only if, after reception of a closing pulse for one of the two switches 25, 225, a (re)opening pulse for this switch was received from control unit 55. In addition, in the case of minimum value storage unit 1 and maximum value storage unit 201, an interface 65, 66; 265, 266 to test device 35 is then also provided for each of these two storage units 1, 201; a respective readout unit 35, 235, error detection unit 40, 240, and threshold value storage unit 60, 260 is then also provided both for minimum value storage unit 1 and for maximum value storage unit 201, while display unit 45 can be provided both for the evaluation of the read-out current minimum adaptation value and for the evaluation of the read-out current maximum adaptation value. As a rule, for the read-out current minimum adaptation value an applied threshold value will then be stored in threshold value storage unit 60 that differs from the one stored in threshold value storage unit 260 for the read-out current maximum adaptation value. The double structure for the use of both minimum value storage unit 1 and maximum value storage unit 201 with respect both to device 5 and to test device 32 is shown in broken lines in FIG. 1.

The resulting extreme adaptation values are typical for the respective drive unit or the vehicle driven by this unit, and depend on the described manufacturing tolerance, aging, and contamination.

What is claimed is:

1. A method for operating a drive unit of a motor vehicle, comprising:

determining, by a driveshaft angle sensor, a driveshaft angle of a driveshaft driven by the drive unit;

representing, for at least one operating quantity of the drive unit, a deviation from an initial value by an adaptation value, wherein the adaptation value is determined at a plurality of points of time at the determined driveshaft angle;

storing, in an extreme value storage unit, a first adaptation value determined at a first point in time;

comparing a second adaptation value, determined at a point in time after the first point in time, with the first adaptation value stored in the extreme value storage unit to determine whether the second adaptation value exceeds the first adaptation value in a predetermined direction; and if the second adaptation value exceeds the first adaptation value in the predetermined direction, overwriting the extreme value storage unit with the second adaptation value; and implementing the second adaptation value which exceeds the first adaptation value to operate the drive unit.

2. The method as recited in claim 1, wherein the second adaptation value is an adaptation value determined immediately after the first adaptation value.

3. The method as recited in claim 2, wherein each currently determined adaptation value is compared with an adaptation value stored immediately before in the extreme value storage unit, and wherein the extreme value storage unit is overwritten by the currently determined adaptation value whenever the currently determined adaptation value exceeds the adaptation value stored immediately before in the extreme value storage unit in the predetermined direction.

4. The method as recited in claim 3, wherein the extreme value storage unit is configured as a minimum value storage unit, and wherein the predetermined direction is a direction towards smaller adaptation values.

5. The method as recited in claim 3, wherein the extreme value storage unit is configured as a maximum value storage unit, and wherein the predetermined direction is a direction towards larger adaptation values.

6. The method as recited in claim 3, wherein the at least one operating quantity of the drive unit includes at least one of: an oxygen concentration in an exhaust gas; a temperature; a degree of opening of one of a valve and a throttle valve; a torque; a torque loss; an air mass flow; a pressure; a controller portion; an ignition point; an injection time; and a rotational speed.

7. The method as recited in claim 3, wherein the extreme value storage unit is initialized by an adaptation value first determined after a start of the drive unit.

8. A device for operating a drive unit of a vehicle, comprising:

an adaptation unit determining an adaptation value to represent a deviation from an initial value of at least one operating quantity of the drive unit, wherein the adaptation value is determined at a plurality of points of time;

a driveshaft angle sensor detecting a driveshaft angle of a driveshaft driven by the drive unit;

a control unit controlling the adaptation unit, the control unit receiving a signal from the driveshaft angle sensor;

an extreme value storage unit, wherein a first adaptation value determined at a first point in time is stored in the extreme value storage unit;

a comparator unit comparing a second adaptation value with the first adaptation value stored in the extreme value storage unit, wherein the second adaptation value is determined at a second point in time after the first point in time;

a testing unit testing whether the second adaptation value exceeds the first adaptation value in a predetermined direction; and a overwrite unit overwriting the extreme value storage unit with the second adaptation value if the second adaptation value exceeds the first adaptation value in the predetermined direction; wherein the control unit implements the second adaptation value which exceeds the first adaptation value to operate the drive unit.

9. A test device for testing a drive unit of a vehicle, comprising:

an adaptation unit determining an adaptation value to represent a deviation from an initial value of at least one operating quantity of the drive unit, wherein the adaptation value is determined at a plurality of points of time;

a driveshaft angle sensor detecting a driveshaft angle of a driveshaft driven by the drive unit;

a control unit controlling the adaptation unit, the control unit receiving a signal from the driveshaft angle sensor;

an extreme value storage unit, wherein a first adaptation value determined at a first point in time is stored in the extreme value storage unit;

a comparator unit comparing a second adaptation value with the first adaptation value stored in the extreme value storage unit, wherein the second adaptation value is determined at a second point in time after the first point in time;

a testing unit testing whether the second adaptation value exceeds the first adaptation value in a predetermined direction;

a overwrite unit overwriting the extreme value storage unit with the second adaptation value if the second adaptation value exceeds the first adaptation value in the predetermined direction; and a read-out unit reading out the adaptation value from the control unit, wherein the read-out unit reads out an extreme adaptation value from the extreme value storage unit of the device; and an error-detection unit detecting an error of the drive unit based on the extreme adaptation value read out from the extreme value storage unit.

10. The test device as recited in claim 9, further comprising:

a display unit providing a display of the extreme adaptation value read out from the extreme value storage unit.

* * * * *